Figure 1:
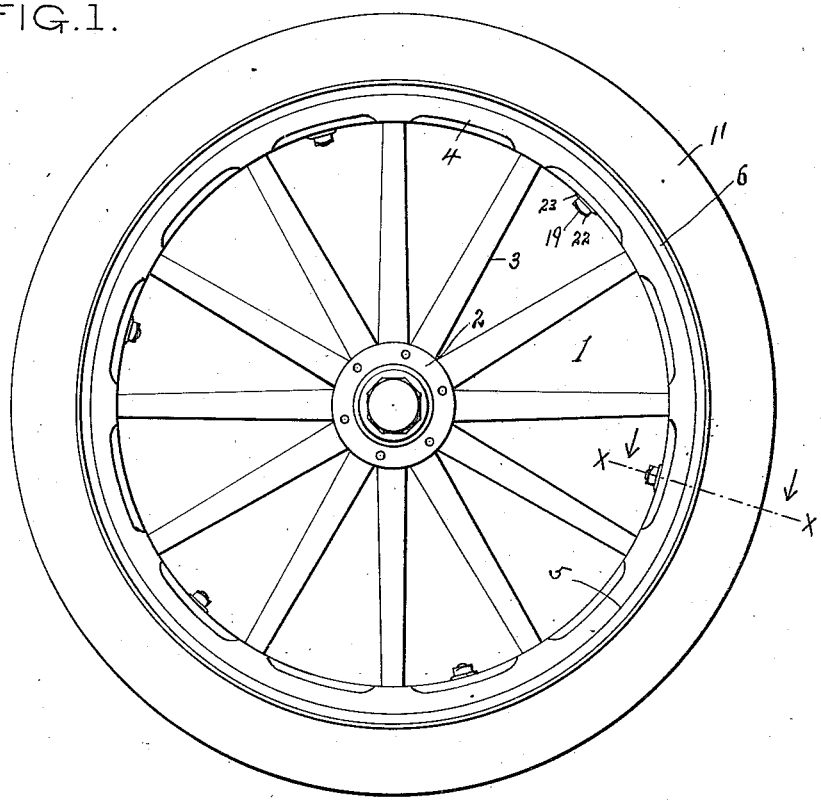

No. 844,201. PATENTED FEB. 12, 1907.
H. L. SLAGER.
TIRE.
APPLICATION FILED AUG. 7, 1905.

2 SHEETS—SHEET 1.

WITNESSES.
William F. Bauer.

INVENTOR.
Henry L. Slager.
BY
ATTORNEY.

No. 844,201.  
PATENTED FEB. 12, 1907.  
H. L. SLAGER.  
TIRE.  
APPLICATION FILED AUG. 7, 1905.  
2 SHEETS—SHEET 2.
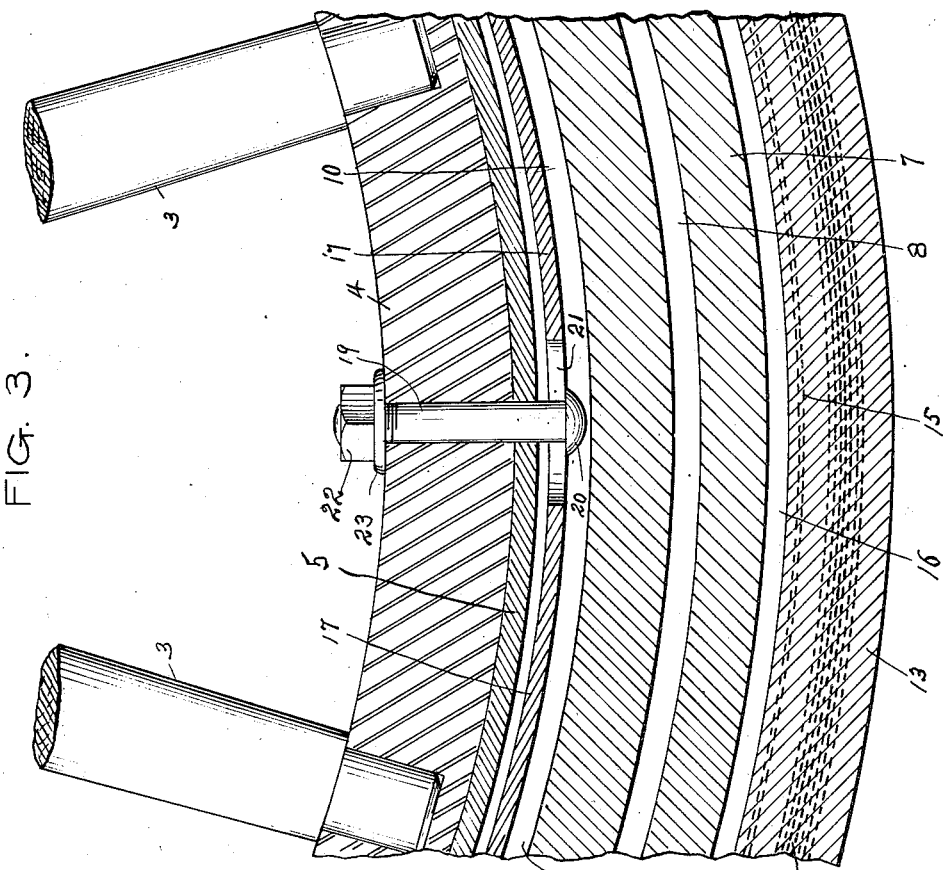
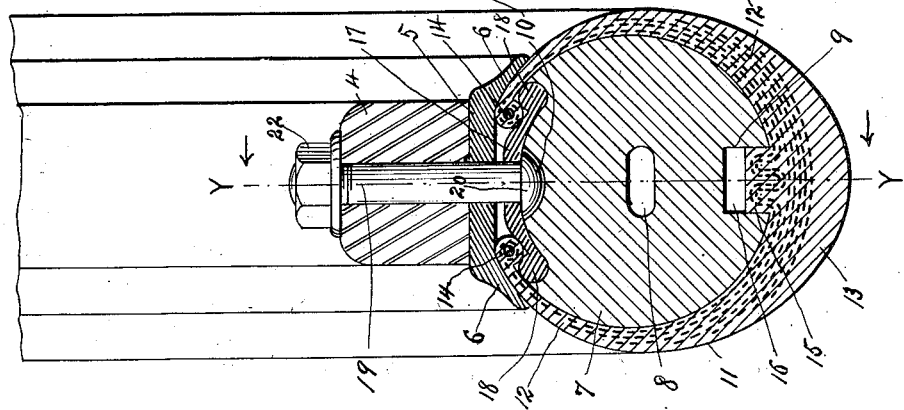
WITNESSES.  
William F. Bauer.  
Ivone Miller.
INVENTOR.  
Henry L. Slager.  
BY  
ATTORNEY.

UNITED STATES PATENT OFFICE.

HENRY L. SLAGER, OF SPRINGFIELD, OHIO, ASSIGNOR OF ONE-HALF TO CHARLES SWIGART, OF CINCINNATI, OHIO.

TIRE.

No. 844,201.     Specification of Letters Patent.     Patented Feb. 12, 1907.

Application filed August 7, 1905. Serial No. 272,956.

*To all whom it may concern:*

Be it known that I, HENRY L. SLAGER, a citizen of the United States, residing at Springfield, in the county of Clark and State of Ohio, have invented certain new and useful Improvements in Tires, of which the following is a specification, reference being had therein to the accompanying drawings.

This invention relates to tires, and more particularly to resilient tires for vehicles, the object being to provide an efficient, durable, and relatively inexpensive tire, particularly adapted for the severe usage to which tires of automobiles and other heavy vehicles are subjected, although the invention is also applicable to other types of vehicle.

At the present time the pneumatic tire, while efficient when in good condition, is found to be not well adapted to the strain of heavy loads at high speed and is liable to become punctured, bursted, or have its efficiency otherwise destroyed, being thus practically lacking in durability. On the other hand, rubber tires which are not pneumatic require such a large mass of rubber to give the necessary resilience that their cost when made of a rubber compound of a purity such as to give the necessary wear-resisting qualities is practically prohibitive.

It is the object of my invention to provide a tire which will be free from the objection of lack of durability which characterizes the pneumatic tire and also free from the excessive cost of the non-pneumatic rubber tire as usually constructed.

To these ends my invention consists in a tire comprising a core or central body made of a rubber compound which while sufficiently resilient is comparatively inexpensive, owing to the fact that it is not constructed of a high-grade rubber compound such as is necessary to withstand the wear of contact with the roadway, this core or body being inclosed in a sheath built up of fabric and a high-grade rubber sufficiently thick on the tread to have the necessary durability and wear-resisting qualities, said sheath being detachably connected to the wheel-rim in such a way as to hold the core or body and sheath which constitute the tire firmly in position in the rim, while permitting their ready removal when necessary. My invention further consists in certain other novel features in a tire of this type, which will be hereinafter described, and pointed out in the claims.

In the accompanying drawings, Figure 1 is an elevation of a vehicle-wheel having applied thereto a tire embodying my invention in one form. Fig. 2 is an enlarged detail sectional view of the same, taken on the line $x\,x$ of Fig. 1 and looking in the direction of the arrows; and Fig. 3 is a similar sectional view, taken on the line $y\,y$ of Fig. 2 and looking in the direction of the arrows.

In the said drawings, 1 represents a wheel of any suitable construction, shown in the present instance as a wooden wheel, comprising a hub 2, spokes 3, and a felly 4. The felly has secured to it a channeled metallic rim 5, having outwardly-flaring flanges 6, the tire proper being seated in the channel of this rim. Said tire proper comprises a core or body 7, approximately circular in cross-section and constructed of a relatively inexpensive rubber compound of low wear-resisting qualities, suitably cured or vulcanized. Many of these compounds are well known to those skilled in the art, and a body of sufficient elasticity or resilience for tire purposes can be obtained at a relatively small expense, provided said body does not have to be of a character such as to resist wear from contact with the roadway. By employing a core or body of this character and protecting it by an inclosing sheath of the character hereinafter described the cost of the tire may be greatly reduced, as compared with a tire of the same bulk or resilient qualities composed entirely of rubber of a grade so high as to adapt it to resist the surface wear of road use. The core or body 7 may be constructed either in the form of a continuous ring or annulus or in the form of a strip or piece the ends of which abut when the core or body is in place in the tire. Said core or body is provided with a central longitudinal aperture 8, forming an airspace, which adds to the resilience of the tire and which gives to the tire the characteristics of what is known as a "cushion-tire." Said core or body is also preferably provided in its outer portion, corresponding to the tread, with a longitudinal groove 9 for the purposes hereinafter set forth, while its diametrically opposite portion adjacent to the rim is preferably provided with a longitudinal groove 10, said inner face being also shaped, as shown, to fit or receive the retaining-band hereinafter referred to.

11 indicates as a whole the outer sheath, which is an endless band of tubular form when in position in the tire, rifted or open along its inner periphery. Said sheath is built up of fabric 12 and a high-grade rubber compound having good wearing qualities, so as to adapt it to resist the wear of contact with the roadway, the two being built up and vulcanized together in a way well known in the art. The high-grade rubber compound is indicated by the numeral 13, and it will be seen that it is very much thickened at the tread, so as to form there a body of rubber of considerable mass and thickness, so as to efficiently protect the inclosed fabric at the point of greatest wear. The margins of the rift of the sheath are provided with beads or enlargements 14, constructed in any of the numerous ways well known in the art—such, for instance, as inclosing or inwrapping in the fabric, cords, wires, or the like. The tread portion of the sheath is provided on its inner surface with a longitudinal rib 15, preferably strengthened or stiffened by having the fabric extended into the same, as shown, which rib extends into and fits between the sides of the external groove 9 of the body or core, but without extending to the bottom of said groove, so as to leave an air-space 16 in the inner portion of said groove.

17 indicates a retaining-band, of steel or the like, non-continuous or severed at one or more points and adapted to encircle the metallic rim and hold the edges of the tire-sheath therein. To this end said retaining-band has its marginal portions beaded, as indicated at 18, or otherwise so constructed as to interlock with the edges of the sheath. Said retaining-band is secured to the felly of the wheel by means of bolts 19, located at suitable intervals around the wheel. Each bolt 19 is provided at its outer end with a head or enlargement 20 and passes through a slot 21 in the retaining-band 17, said slot being longitudinal with respect to the band and of a width conforming to the diameter of the body of the bolt and less than the diameter of the head 20. The body of the bolt extends through apertures in the metallic rim 5 and felly 4, beyond which its threaded end projects inward and receives a nut 22 and washer 23. It will be seen that by turning the nuts 22 in the proper direction the heads 20 of the bolts 19 may be caused to draw the retaining-band 17 firmly down into the channel of the rim, the slots 21 permitting the longitudinal movement of the band relatively to the bolts arising from the decrease thus caused in the diameter of the band. The groove 10 provides a space for the heads 20.

It will be seen that when the nuts 22 are loosened, so as to loosen the retaining-band 17, the core or body and its inclosing sheath may be applied to the wheel, and the beaded edges of the sheath may be introduced between the retaining-band and the channeled metallic rim. The nuts 22 may be then tightened up, whereupon the retaining-band will be drawn down into the channel-rim and its edges will interlock with those of the sheath and will hold both the sheath and the core or body of the tire firmly in position on the wheel. A reversal of these operations will effect the release of the tire and permit its removal.

It will be seen that I have provided a tire which is capable of ready application to and removal from the wheel and which will be held firmly in place on the wheel. The interlocking of the core and sheath by means of the groove and rib provided for that purpose prevents the core from turning axially in the sheath and maintains in proper relative position the parts, this result being further aided by the shaping of the base of the core to conform to the retaining-band and by the seating of the bolt-heads 20 in the grooves 10. It will be further seen that while the tire has all the advantages of detachability and of being taken apart into its constituent elements possessed by the pneumatic tire, it has much greater efficient durability, since it is not open to the danger of collapse from puncture or bursting and is still efficient as a tire even when punctured or cut. Furthermore, although the mass and resilience of the tire are equal to those of a solid or cushion rubber tire of high-grade rubber, the cost of the tire is materially less, since the great bulk thereof is made of a much less expensive material. With regard to its wear-resisting qualities the tire is practically superior to that of a solid-rubber tire, since the core or body may be used indefinitely, and the sheath, which has a wearing resistance equal to that of a solid-rubber tire, proportionately speaking, may be readily renewed when worn, while the solid-rubber tire after being worn past its point of efficiency must be discarded and entirely replaced. As already stated, the resilience of the tire is amply sufficient and is enhanced not only by the central air-space 8, but also by the air-space 16 and by the air-space formed within the groove 10.

I do not wish to be understood as limiting myself to the precise details of construction hereinbefore described and shown in the accompanying drawings, as it is obvious that these details may be modified without departing from the principle of my invention.

Having thus fully described my invention, what I claim as new, and desire to secure by Letters Patent, is—

1. The combination, with a vehicle-wheel, of a tire therefor comprising a central body or core composed of a vulcanized, resilient rubber compound of low wear-resisting qualities, and an outer removable sheath composed of fabric and a rubber compound of high wear-resisting qualities, and means for detachably securing said sheath to the wheel-rim, said core or body having longitudinal grooves or air-spaces on opposite sides thereof and an internal air-space between said first-mentioned air-spaces, said air-spaces being in radial alinement with the rim of said wheel.

2. The combination, with a vehicle-wheel, of a tire therefor comprising a body or core of vulcanized, resilient rubber compound of relatively low wear-resisting qualities, provided with a longitudinal groove in its outer periphery, and a removable inclosing sheath composed of fabric and a rubber compound of relatively high wear-resisting qualities, said sheath having on the inner surface of its tread portion a rib to engage the groove of the body or core, and means for detachably connecting said sheath to the wheel-rim, substantially as described.

3. The combination, with a vehicle-wheel, of a tire therefor comprising a body or core of vulcanized, resilient rubber compound of relatively low wear-resisting qualities, provided with a longitudinal groove in its outer periphery, and a removable inclosing sheath composed of fabric and a rubber compound of relatively high wear-resisting qualities, said sheath having on the inner surface of its tread portion a rib to engage the groove of the body or core, and means for detachable connecting said sheath to the wheel-rim, said rib fitting between the side walls of said groove and being of less depth than said groove, whereby an air-space is formed, substantially as described.

4. The combination, with a vehicle-wheel having a channeled metallic rim, of a tire therefor comprising a core or body composed of a vulcanized, resilient rubber compound of relatively low wear-resisting qualities, having a longitudinal groove in the side adjacent to said rim and an outer removable sheath composed of fabric and a rubber compound of relatively high wear-resisting qualities, said sheath being circumferentially rifted at its inner portion, the margins thus formed being provided with engaging devices, and retaining means comprising a metallic band, the margins of which are provided with engaging devices to coöperate with those of the sheath, and bolts having heads adapted to enter the groove in said core and to engage said band from the outside thereof, said bolts extending through the metal rim and wheel-felly and being provided with nuts on their projecting ends, substantially as described.

5. The combination, with a vehicle-wheel having a channeled metallic rim, of a tire therefor comprising a core or body composed of a vulcanized, resilient rubber compound of relatively low wear-resisting qualities, having a longitudinal groove in the side adjacent to said rim and an outer removable sheath composed of fabric and a rubber compound of relatively high wear-resisting qualities, said sheath being circumferentially rifted at its inner portion, the margins thus formed being provided with engaging devices, and retaining means comprising a metallic band, the margins of which are provided with engaging devices to coöperate with those of the sheath, and bolts having heads adapted to enter the groove in said core and to engage said band from the outside thereof, said bolts extending through the metal rim and wheel-felly and being provided with nuts on their projecting ends, said retaining-band being discontinuous and provided with longitudinal slots for the passage of the bolts, substantially as described.

In testimony whereof I affix my signature in presence of two witnesses.

HENRY L. SLAGER.

Witnesses:
IRVINE MILLER,
HARRIET HAMMAKER.